United States Patent [19]
He

[11] Patent Number: 6,098,939
[45] Date of Patent: Aug. 8, 2000

[54] ELECTRICAL JUNCTION BOX SUPPORTING BRACKET

[76] Inventor: Ping He, 1062 Thistlegate Rd., Agoura, Calif. 91301

[21] Appl. No.: 09/228,480

[22] Filed: Jan. 11, 1999

[51] Int. Cl.[7] .................................................. A47B 96/06
[52] U.S. Cl. ......................... 248/205.1; 174/58; 220/3.5; 220/3.6; 248/27.1; 248/906
[58] Field of Search ............................... 248/27.1, 200.1, 248/200, 205.1, 300, 906, 343; 174/49, 58, 68.3, 101; 220/3.6, 3.9, 3.5; 59/78.1

[56] References Cited

U.S. PATENT DOCUMENTS

| D. 342,938 | 1/1994 | Cheatham | D13/154 |
|---|---|---|---|
| 3,972,498 | 8/1976 | Paskert | 248/205.1 |
| 4,497,416 | 2/1985 | Smolik | 220/3.5 |
| 4,576,302 | 3/1986 | Smolik | 220/3.5 |
| 5,009,383 | 4/1991 | Chapman | 248/343 |
| 5,114,105 | 5/1992 | Young | 248/27.1 |
| 5,452,873 | 9/1995 | Laughlin | 248/205.1 |
| 5,646,371 | 7/1997 | Fabian | 174/58 |
| 5,810,303 | 9/1998 | Bourassa et al. | 248/906 X |
| 5,965,844 | 10/1999 | Lippa | 174/49 |

*Primary Examiner*—Ramon O. Ramirez
*Assistant Examiner*—Tan Le
*Attorney, Agent, or Firm*—Roy A. Ekstrand

[57] ABSTRACT

A bracket includes a generally planar vertical member having an upper end supporting a pair of spacer arms and a spacer plate for positioning the vertical member between wall surfaces. The bracket further includes a junction box support portion having a plurality of spacers each having end portions for further maintaining the position of the bracket within the wall. The lower portion of the bracket includes a pair of support arms having inverted V-shaped clips together with an attachment plate defining an inverted V-channel, each adapted to be received upon the upwardly extending lips of a conventional toe plate stud. A conventional electrical junction box is secured to the bracket using conventional fasteners and a plurality of apertures formed in the bracket. The various spacers and support members of the bracket cooperate to maintain the desired position of the bracket within the wall for supporting the junction box.

11 Claims, 2 Drawing Sheets

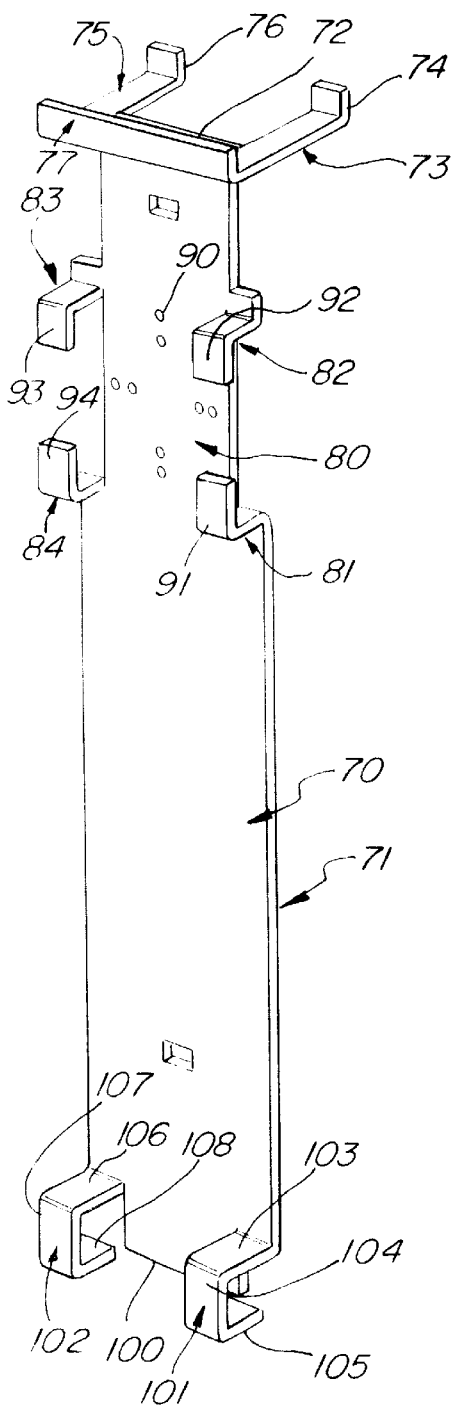
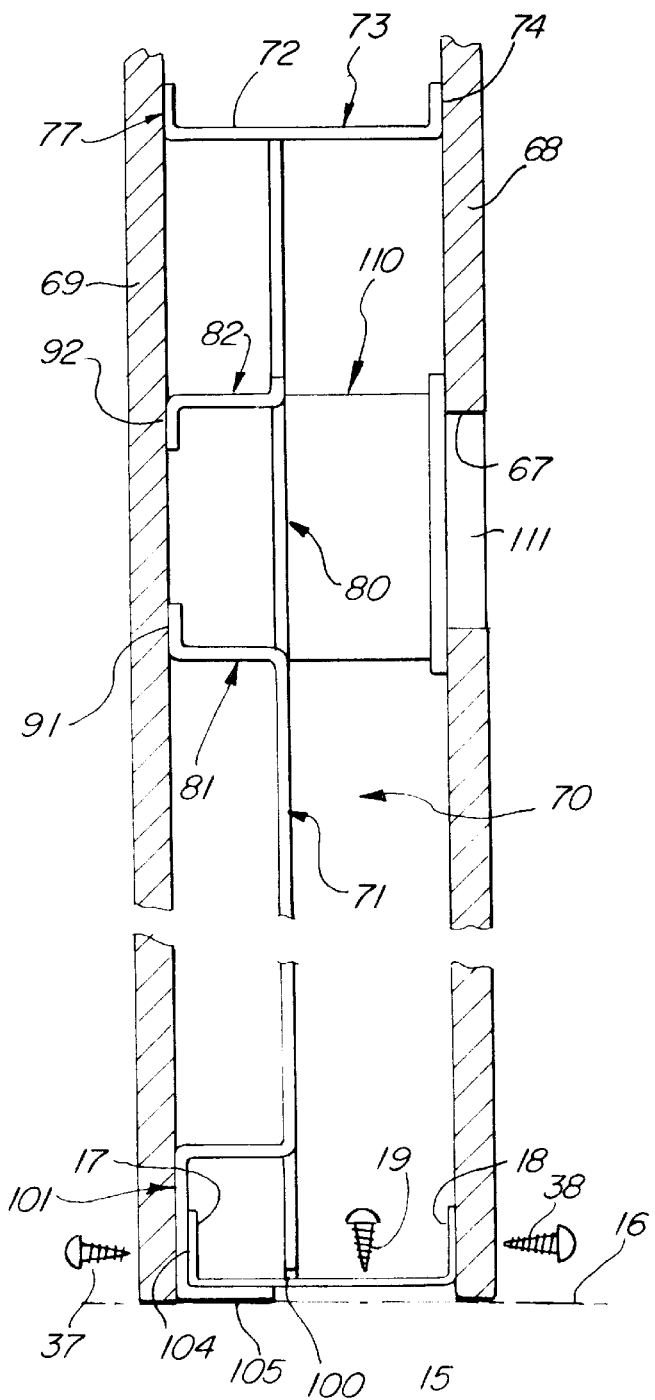
FIG. 3
FIG. 4

ELECTRICAL JUNCTION BOX SUPPORTING BRACKET

SPECIFICATION

1. Field of the Invention

This invention relates generally to electrical junction box supporting apparatus and particularly to apparatus suited to supporting an electrical junction box within the interior of a studded wall.

2. Background of the Invention

In many residential, commercial and industrial structures, electrical power is provided by a network of wiring which includes sets of power coupling wires extending through walls and ceilings of the various rooms or areas of the structure. This electrical power is ultimately made accessible for use by occupants of such structures through a plurality of wall outlets positioned about the various rooms or other areas. While the structures of such wall outlets vary somewhat in design, basically all provide one or more receptacles which are coupled to operative power and which are configured to receive a plural terminal plug or the like. In a typical power distribution system within a structure, a plurality of such electrical junction boxes are supported within the walls at various locations and are typically formed of a metal or other material box-like structure. A socket assembly having socket receptacles for electrical power plug cooperation are supported within the electrical junction boxes and are connected to the power distributed wires within the wall. For safety and aesthetic purposes, a cover plate is usually provided which is secured to the junction box overlying the area surrounding the socket assemblies. In most, if not all, modern structures fabricated through the years, the basic wall and partition structure employs a studded wall framework having an overlying layer of planar material such as drywall (often called wallboard) or other suitable material secured to the studded framework. Since the drywall layer is usually secured to both sides of the studded framework, a space is created within the wall between the overlying layers on each side of the framework which is convenient for use in receiving the various power conducting wires and electrical junction box combination for power distribution. Support for electrical junction boxes within such interior wall spacing has varied from simply attaching the junction box to the nearest wall stud to complex and intricate support brackets within the wall.

In recent years, increasing numbers of structures have been fabricated which employ "metal studs" rather than the traditional wooden studs used through the years. The advantages of such metal studs are substantial in that their use usually provides lower construction costs and greater fire resistance of the structure interior. In addition, it has become important to reduce the number of trees harvested for lumber which makes metal stud fabrication all the more appealing. A typical metal stud comprises an elongated U-shaped metal member having a width approximately equal to the standard wooden stud. Such metal studs may be cut easily with a simple metal shears and may be readily secured to each other using sheet metal screws and a power-driven drill or the like. Thus, a typical studded wall using such metal stud fabrication employs a header plate extending across the upper portion of the partition, a toe plate extending along the bottom thereof and a plurality of vertical studs connected therebetween in a uniformly spaced arrangement and all being screwed to the header plate and toe plate. Finally, a drywall or other suitable wallboard material is secured to the studded framework overlying the structure thereof and secured thereto by a plurality of screws.

With the continued popularity and increasing use of metal studs in various structure fabrications which employ electrical power, various brackets and supports for securing electrical junction boxes within walls and partitions have been provided by practitioners in the art. For example, U.S. Pat. No. 5,423,499 issued to Webb sets forth an ELECTRICAL JUNCTION BOX MOUNTING BRACKET DEVICE AND METHOD for use in the interior space of hollow partitions having a front wall and a back wall and a space therebetween. The junction box mounting bracket device includes a base securable to the floor, a riser extending upwardly from the base and supporting means for supporting a cover ring and junction box within the interior space. The supporting means defines an aperture therethrough and facilitates the attachment of a junction box annular plate and junction box from opposite sides using conventional fasteners. A stabilizing arm extends laterally from the riser supporting portion to space the structure within the wall interior.

U.S. Pat. No. 5,224,673 issued to Webb sets forth an ELECTRICAL JUNCTION BOX MOUNTING BRACKET DEVICE AND METHOD for use within the interior space of a studded wall having a base attachable to the floor and a riser extending upwardly from the base together with supporting means for supporting a cover ring and a junction box within the interior space. A stabilizing arm extends laterally and rearwardly from the device to the rear wall of the partition and means are provided for altering the spacing and position of the junction box thus supported.

U.S. Pat. No. 5,098,046 issued to Webb sets forth an ELECTRICAL JUNCTION BOX MOUNTING BRACKET DEVICE AND METHOD for use in supporting electrical devices within the interior of hollow partitions or walls. The device includes a base capable of being fixedly attached to the floor, a riser extending upwardly from the base, and an annular plate having front and rear faces attached to the upper portion of the riser and having an opening therethrough. A junction box is securable to one side of the upper portion while an annular ring is secured to the remaining side. A spacer extends rearwardly from the annular portion to support the junction box within the wall.

U.S. Pat. No. 5,288,041 issued to Webb sets forth an ELECTRICAL JUNCTION BOX MOUNTING BRACKET DEVICE AND METHOD having a base securable to the floor and a vertically extending riser therefrom. A second vertical element is adjustably secured to the riser and supports an annular upper portion suitable for securing a junction box and ring plate thereto. An adjustable spacer extends laterally and rearwardly from the annular portion to further support the junction box within the wall.

While the foregoing described prior art devices have provided improvement in the art and have, in some instances, enjoyed commercial success, there remains nonetheless a continuing need in the art for evermore improved, efficient and cost effective apparatus for supporting electrical junction boxes within the interior spaces of walls and partitions.

SUMMARY OF THE INVENTION

Accordingly, it is a general object of the present invention to provide an improved electrical junction box supporting bracket for use in interior walls. It is a more particular object of the present invention to provide an improved electrical junction box supporting bracket which is better adapted to be secured to the toe plate of the wall or partition and which is more securely spaced within the interior space of a typical studded wall.

In accordance with the present invention, there is provided an electrical junction box supporting bracket for use in the interior of a studded wall formed by a studded frame including a toe plate and a pair of planar wallboard sheets for positioning and securing an electrical junction box, the bracket comprising: a vertical member having an upper end and a lower end; a pair of equal-length support arms each having ends extending from the lower end in a first direction; a flange spacer, extending from the lower end in a second direction generally opposite to the first direction, having an attachment plate; a junction box support portion of the vertical member having a plurality of spacers each having an end and each extending in the second direction from the vertical member; a pair of spacer arms extending in the first direction from the upper end each having an end; and a plate spacer extending from the upper end in the second direction having a spacer plate, the pair of support arms and the flange spacer cooperating to position the lower end upon a toe plate and the plurality of spacers cooperating to position the junction box support portion and the pair of spacer arms, the plate spacer and the spacer plate cooperating to position the lower end within a wall interior.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a perspective view of an alternate embodiment of the present invention electrical junction box supporting bracket; and FIG. 4 sets forth a section view of a typical wall having the alternate embodiment of the present invention electrical junction box supporting bracket of FIG. 3 secured therein together with a conventional electrical junction box.

DESCRIPTION OF THE PREFERRED EMBODIMENTS

Figure 1:
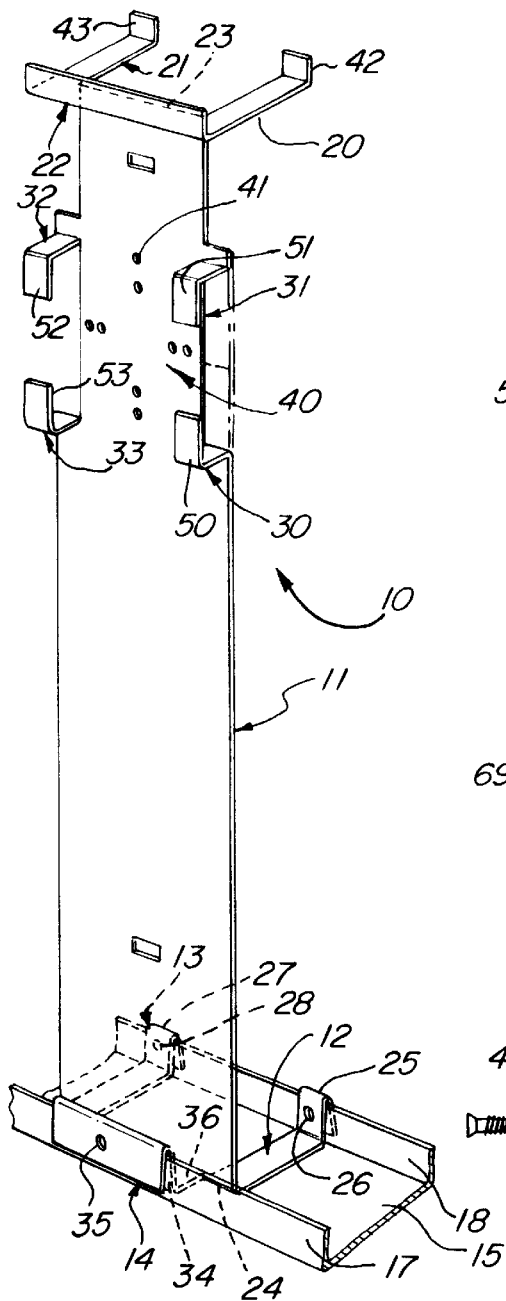
FIG. 1 sets forth a perspective view of an electrical junction box supporting bracket constructed in accordance with the present invention.

FIG. 1 sets forth a perspective view of an electrical junction box supporting bracket constructed in accordance with the present invention and generally referenced by numeral 10. Bracket 10 is preferably formed of a stamped metal fabrication in which a generally planar steel blank is subjected to various cutting and stamping operations to form the structure of bracket 10. Thus, bracket 10 includes a generally planar vertical member having an upper end 23 and a lower end 24. Bracket 11 further includes a pair of spacer arms 20 and 21 formed at upper end 23 and having end portions 42 and 43 formed thereon at right angles to arm 20. Bracket 10 further includes a spacer plate 22 positioned from upper end 23 by a plate spacer 55 (seen in FIG. 2).

Bracket 10 further includes a junction box support 40 which includes a plurality of apertures 41 formed in vertical member 11. Junction box support 40 further includes a plurality of spacers 30, 31, 32 and 33 arranged in a generally square arrangement about apertures 41. Spacers 30 through 33 define respective right angled end portions 50 through 53 respectively. As is shown by the dashed-line material adjacent spacers 30 and 31, spacers 30 and 31 are formed by cutting and bending a portion of vertical member 11. Similarly, spacers 32 and 33 are formed by a corresponding cut and bend of vertical member 11.

Bracket 10 further includes a pair of support arms 12 and 13 which extend from lower end 24. Support arm 12 further accommodates an inverted V-clip 25 having an aperture 26 formed therein. Similarly, support arm 13 includes an inverted V-clip 27 having an aperture 28 formed therethrough. A flange spacer 36 extends from lower end 24 and supports a V-shaped attachment plate 14. Attachment plate 14 defines an inverted V-channel 34 and an aperture 35 formed therein.

FIG. 1 also shows a conventional metal stud positioned to form a toe plate 15. Toe plate 15 is fabricated entirely in accordance with conventional fabrication techniques and is formed of sheet metal or the like. Toe plate 15 further includes a pair of spaced apart upwardly extending lips 17 and 18.

In accordance with the present invention, bracket 10 is positioned within the wall space formed on each side of toe plate 15 such that lower end 24 rests upon the upper surface of toe plate 15. When so positioned, bracket 11 is secured to toe plate 15 by inverted V-clips 25 and 27 upon lip 18 and by the insertion of lip 17 within inverted V-channel 34. It has been found that the present invention bracket maintains a secure attachment to the underlying toe plate. However, for added attachment security, a plurality of fasteners such as fasteners 44 and 45 shown in FIG. 2 may be driven through apertures 26, 28 and 35 of clips 25 and 27 as well as aperture 35 of attachment plate 14. This provides further security of attachment to toe plate 15.

Figure 2:
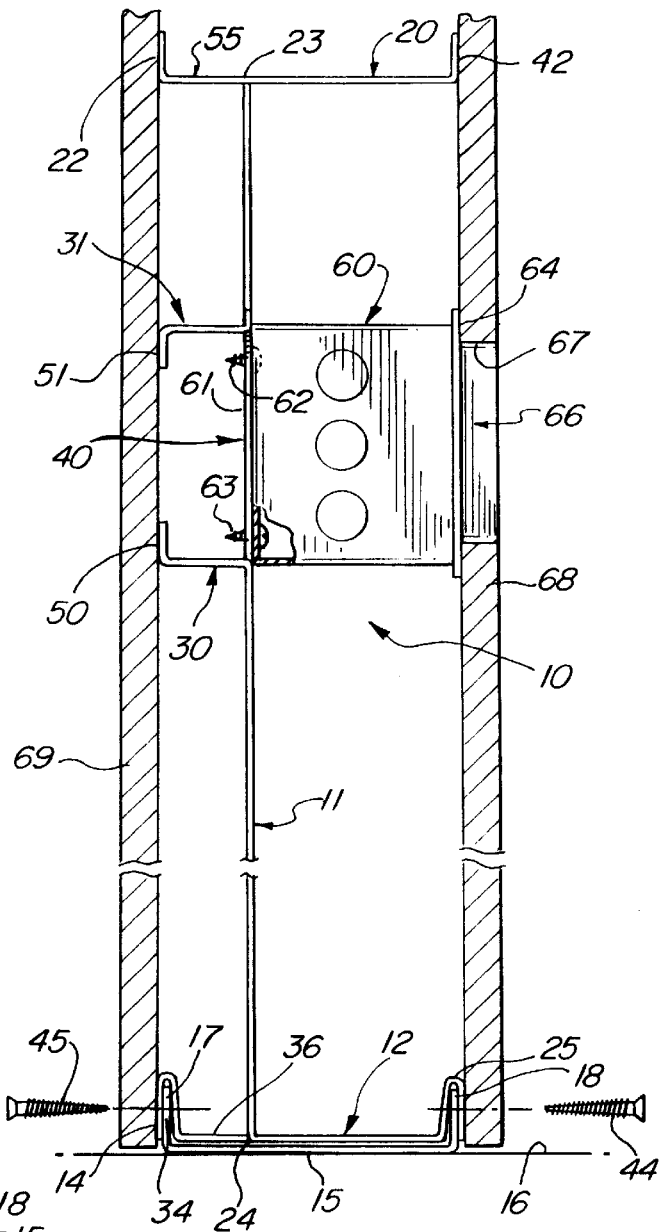
FIG. 2 sets forth a section view of a typical studded wall having the present invention electrical junction box supporting bracket and a typical electrical junction box secured therein.

Spacers 30 through 33 and ends 50 through 53 maintain a localized spacer and support function for junction box support portion 40 when installed in the manner shown in FIG. 2. Similarly, the combination of spacer arms 20 and 21, ends 42 and 43, and spacer plate 22 maintain the proper position of bracket 10 within a wall space as shown in FIG. 2. It will be noted that the entire structure of bracket 10 is readily formed through a conventional cutting and stamping process from a single blank of steel sheet material or the like.

FIG. 2 sets forth a section view of a typical wall having a metal stud frame structure and overlying wallboard or drywall on opposed surfaces thereof having bracket 10 installed therein to support a junction box 60. More specifically, a pair of generally planar wallboard sheets 68 and 69 are positioned in a parallel arrangement extending upwardly on either side of a conventional toe plate 15 from a floor surface 16. Toe plate 15 includes a pair of upwardly extending lip portions 17 and 18. Basically, the spacing of lips 17 and 18 defines the standard spacing of the wall. While not seen in FIG. 2 to avoid unduly cluttering the drawing, it will be understood that a plurality of vertically extending studs are secured to toe plate 15 at various positions within the wall between wallboards 68 and 69.

As described above, bracket 10 includes a vertical member 11 having an upper end 23 and a lower end 24. As is also described above, bracket 10 includes a junction box support 40 having a plurality of apertures 41 formed therein. Bracket 10 further includes a pair of spacer arms 20 and 21 (arm 21 shown in FIG. 1) which terminate in end portions 42 and 43 (end 43 shown in FIG. 1). A plate spacer 55 extends from upper end 23 and supports a spacer plate 22. It will be apparent to those skilled in the art that the combined dimensions of plate spacer 55 and spacer arm 20 are selected to correspond to the desired spacing between wall boards 68 and 69.

As is seen in FIG. 1, a plurality of apertures 41 are formed in bracket 10 within the junction box support portion. Apertures 41 are utilized in that attachment of a conventional junction box 60 having a rear surface 61 against bracket 10 using a plurality of fasteners such as fasteners 62 and 63. A plurality of spacers such as spacers 30 and 31 extend from support portion 40 and define respective ends 50 and 51 in contact with wallboard 69. Junction box 60 is of conventional fabrication and defines a front edge 64. A ring plate also of conventional fabrication is received upon junction box 60 and secured in accordance with conventional fabrication techniques. In further accordance with conventional fabrication techniques, an aperture 67 is formed within wallboard 68 allowing ring plate 66 to extend therethrough. While not shown in FIG. 2, it will be understood that one or more socket assemblies are received by junction box 60 and ring plate 66 in a conventional fabrication.

Bracket 10 further includes a flange spacer 36 extending from lower end 24 and defining an inverted V-shaped attachment plate 14. Attachment plate 14 forms an inverted V-shaped 34 which is received upon lip 17 of toe plate 15. Correspondingly, bracket 10 includes an arm support 12 which includes an inverted V-clip 25. Clip 25 is received upon lip 18 to complete the attachment of bracket 10 in the wall shown in FIG. 2. Once again, it has been found that the present invention bracket may be utilized without the additional attachment of fasteners. However, greater strength and reliability is obtained by utilizing a plurality of fasteners such as fasteners 44 and 45 to secure attachment plate 14, clip 25 and clip 27 (seen in FIG. 1) to lips 17 and 18 respectively of toe plate 15. In the preferred attachment of the present invention, fasteners 44 and 45 are secured prior to the overlay positioning of wallboards 68 and 69. Further, toe plate 15 will be understood to be secured to floor 16 using conventional fabrication techniques (not shown).

The resulting structure shown in FIG. 2 maintains the position of vertical member 11 and the remainder of bracket 10 within the space between wallboards 68 and 69 to support and accommodate junction box 60 at the proper position and alignment and at the appropriate distance from wallboard 68 to secure ring plate 66 within aperture 67. The resulting structure is extremely easy to install and utilize. It will be apparent to those skilled in the art that vertical member 11 may be fabricated at different heights should different off the wall dimensions be required in any particular structure.

FIG. 3 sets forth a perspective view of an alternate embodiment of the present invention electrical junction box supporting bracket generally referenced by numeral 70. By way of overview, bracket 70 is substantially identical to bracket 10 set forth above with the sole difference being found at the lower end of the bracket and the mechanism utilized to secure the lower end to a toe plate. Thus, bracket 70 includes a vertical member 71 having a junction box support portion 80 defining a plurality of apertures 90. Bracket 70 further includes a plurality of extending spacers 81 through 84 each having a corresponding right angle end 91 through 94. In further similarity to the structure of bracket 10 (seen in FIG. 1), vertical member 71 includes an upper end 72. A pair of spacer arms 73 and 75 define respective right angled ends 74 and 76. A spacer plate 77 is further supported by vertical member 71.

Thus, the structure of bracket 70 thus far described will be understood to be substantially identical to the corresponding structure of bracket 10 shown in FIG. 1. Vertical member 71 further defines a lower end 100 having a pair of lower clasps 101 and 102 formed therein. Clasps 101 and 102 are formed on each side of lower end 100. Clasp 101 includes an arm 103 generally perpendicular to vertical member 71, an end 104 generally perpendicular to arm 103 and a return 105 generally parallel to arm 103. Similarly, lower clasp 102 includes an arm 106, an end 107 and a return 108.

FIG. 4 sets forth a section view of a typical wall formed by spaced apart wallboards 68 and 69 together with a conventional toe plate 15 secured to a floor surface 16. As mentioned above, bracket 70 is substantially identical to bracket 10 with the exception of the method of attachment to toe plate 15. Accordingly, bracket 70 is positioned such that vertical member 71 extends upwardly between wallboard portions 68 and 69. Bracket 70 includes a spacer plate 77 and a spacer arm 73. The latter terminates in an end 74. The distance formed between spacer plate 77 and end 74 of spacer arm 73 corresponds to the distance between wallboards 68 and 69. Bracket 70 further includes a junction box support portion which receives a conventional junction box 110 using conventional fasteners (not shown). In further accordance with conventional fabrication techniques, wallboard 68 defines an aperture 67 which positions a conventional ring plate 111 secured to junction box 110. Bracket 70 further includes a plurality of spacers such as spacers 81 and 82 having respective ends 91 and 92. The position of spacers 81 through 84 and ends 91 through 94 (seen in FIG. 3) cooperates with junction box 110 and ring plate 111 to properly space the junction box with respect to wall 68.

Bracket 70 further includes a lower end 100 which is received upon toe plate 15. Clasp 101 is assembled to toe plate 15 such that arm 103 and end 104 position return 105 beneath toe plate 15. The cooperation of end 104 and return 105 together with lower end 100 of vertical member 71 secure the position of vertical member 71 within the wall space.

In a similar fashion to that shown for clasp 101, clasp 102 (seen in FIG. 3) is also assembled to toe plate 15. The attachment of bracket 70 to toe plate 15 may be completed by driving a plurality of fasteners such as fastener 37 through end 104 and lip 17 of toe plate 15. Preferably, this is done prior to the positioning of wallboard 69.

Clasp 102 is assembled to toe plate 15 in the same manner described for clasp 101 and is similarly secured. Finally, toe plate 15 is secured to floor 16 by a plurality of conventional fasteners such as fasteners 19. It will be noted that the attachment of bracket 70 to toe plate 15 may, in most instances, be attained even though fasteners have secured toe plate 15 previously.

What has been shown is an electrical junction box supporting bracket having a simple, reliable and economically attractive structure for positioning and supporting an electrical junction box within the interior space of a conventional studded wall. The bracket shown is easily fabricated of a single metal blank through conventional cutting and stamping operations and is low in cost despite its many features of reliability and ease of installation.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An electrical junction box supporting bracket for use in the interior of a studded wall formed by a studded frame including a toe plate and a pair of planar wallboard sheets for positioning and securing an electrical junction box, said bracket comprising:

a vertical member having an upper end and a lower end;

a pair of equal-length support arms each having ends extending from said lower end in a first direction;

a flange spacer, extending from said lower end in a second direction generally opposite to said first direction, having an attachment plate;

a junction box support portion of said vertical member having a plurality of spacers each having an end and each extending in said second direction from said vertical member;

a pair of spacer arms extending in said first direction from said upper end each having an end; and a plate spacer extending from said upper end in said second direction having a spacer plate, said pair of support arms and said flange spacer cooperating to position said lower end upon a toe plate and said plurality of spacers cooperating to position said junction box support portion and said pair of spacer arms, said plate spacer and said spacer plate cooperating to position said lower end within a wall interior.

2. The electrical junction box supporting bracket set forth in claim 1 wherein said support arm ends are each formed as right-angle bends of said support arms.

3. The electrical junction box supporting bracket set forth in claim 2 wherein said ends of said plurality of spacers are each formed as right-angle bends of said spacers.

4. The electrical junction box supporting bracket set forth in claim 3 wherein said ends of said spacer arms each define an inverted V-shaped member for receiving a toe plate lip and wherein said spacer plate defines an inverted V-shaped plate having a channel therein for receiving a toe plate lip.

5. The electrical junction box supporting bracket set forth in claim 1 wherein said ends of said spacer arms each define an inverted V-shaped member for receiving a toe plate lip and wherein said spacer plate defines an inverted V-shaped plate having a channel therein for receiving a toe plate lip.

6. The electrical junction box supporting bracket set forth in claim 5 wherein said ends of said plurality of spacers are each formed as right-angle bends of said spacers.

7. The electrical junction box supporting bracket set forth in claim 6 wherein said support arm ends are each formed as right-angle bends of said support arms.

8. An electrical junction box supporting bracket for use in the interior of a studded wall formed by a studded frame including a toe plate and a pair of planar wallboard sheets for positioning and securing an electrical junction box, said bracket comprising;

a vertical member having an upper end and a lower end;

a pair of lower clasps extending in a second direction each defining a horizontal arm, an end and a horizontal return;

a junction box support portion of said vertical member having a plurality of spacers each having an end and each extending in said second direction from said vertical member;

a pair of spacer arms extending in a first direction from said upper end each having an end; and a plate spacer extending from said upper end in said second direction having a spacer plate, said pair of support arms and said flange spacer cooperating to position said lower end upon a toe plate and said plurality of spacers cooperating to position said junction box support portion and said pair of spacer arms, said plate spacer and said spacer plate cooperating to position said lower end within a wall interior.

9. The electrical junction box supporting bracket set forth in claim 8 wherein said support arm ends are each formed as right-angle bends of said support arms.

10. The electrical junction box supporting bracket set forth in claim 9 wherein said ends of said plurality of spacers are each formed as right-angle bends of said spacers.

11. The electrical junction box supporting bracket set forth in claim 8 wherein said ends of said plurality of spacers are each formed as right-angle bends of said spacers.

* * * * *